(12) United States Patent
Goodwin et al.

(10) Patent No.: US 9,669,684 B2
(45) Date of Patent: Jun. 6, 2017

(54) CLIP ON CAR VISOR EXTENSION

(71) Applicants: Marlan Dean Goodwin, Upland, CA (US); Leticia Martha Goodwin, Upland, CA (US)

(72) Inventors: Marlan Dean Goodwin, Upland, CA (US); Leticia Martha Goodwin, Upland, CA (US)

( * ) Notice: Subject to any disclaimer, the term of this patent is extended or adjusted under 35 U.S.C. 154(b) by 0 days.

(21) Appl. No.: 13/775,609

(22) Filed: Feb. 25, 2013

(65) Prior Publication Data
US 2014/0239665 A1    Aug. 28, 2014

(51) Int. Cl.
*B60J 3/02*    (2006.01)
(52) U.S. Cl.
CPC .................... *B60J 3/0208* (2013.01)
(58) Field of Classification Search
CPC ........................................... B60J 3/0208
USPC .............................. 296/96.7, 96.9; 248/298.1
See application file for complete search history.

(56) References Cited

U.S. PATENT DOCUMENTS

| | | | | |
|---|---|---|---|---|
| 2,020,585 A * | 11/1935 | Stansberry | .................. | 296/97.6 |
| 2,757,955 A * | 8/1956 | Chester | ........................ | 296/97.6 |
| 2,824,763 A * | 2/1958 | Extrom | ........................ | 296/97.6 |
| 3,085,827 A * | 4/1963 | Cederberg et al. | .......... | 296/97.6 |
| 3,158,396 A * | 11/1964 | Berger | ......................... | 296/97.6 |
| 3,304,118 A * | 2/1967 | Jonas | ............................ | 296/97.6 |
| 3,343,867 A * | 9/1967 | Couch et al. | ............... | 296/97.9 |
| 3,415,569 A * | 12/1968 | Leevo | .................... | B60J 3/0208 |
| | | | | 296/97.6 |
| 4,323,275 A | 4/1982 | Lutz | | |
| 4,580,829 A | 4/1986 | Matheopoulos | | |
| 4,728,142 A | 3/1988 | Gavagan | | |
| 4,792,176 A | 12/1988 | Karford | | |
| 4,824,161 A | 4/1989 | Lee | | |
| 5,271,653 A * | 12/1993 | Shirley | ........................ | 296/97.8 |
| 5,662,370 A * | 9/1997 | Kassner | ....................... | 296/97.6 |
| 5,921,607 A * | 7/1999 | Brooks et al. | ............... | 296/97.6 |
| 6,325,442 B1 * | 12/2001 | Hunker | ........................ | 296/97.6 |
| 2005/0017534 A1 * | 1/2005 | Driscoll | ........................ | 296/97.6 |
| 2011/0067278 A1 * | 3/2011 | Hulbert | ........................... | 40/593 |
| 2011/0074178 A1 * | 3/2011 | Saitoh et al. | ................ | 296/97.6 |
| 2013/0001977 A1 * | 1/2013 | Marcus | ........................ | 296/97.6 |

* cited by examiner

*Primary Examiner* — Pinel Romain

(57) ABSTRACT

A clip on car visor extension for use on a vehicle's existing sun visor, effectively blocks out sunrays which the visor itself is not capable of blocking on its' own. The clip on car visor extension is made up of a clip member and a glare reducing sheet element, rotatably fastened on the clip member. The clip member has two elongated legs joined at the closed end by a connecting leg. The glare reducing sheet element is preferably rectangular shaped.
The clip on car visor extension can be moved laterally or horizontally on the vehicles sun visor as needed by moving the clip member and radially rotating the glare reducing sheet element to an angle as needed depending on the user's position and sun's position in the sky.

4 Claims, 4 Drawing Sheets

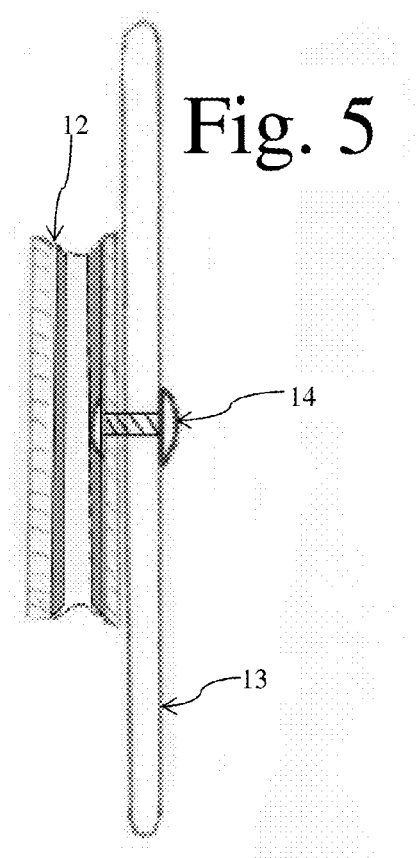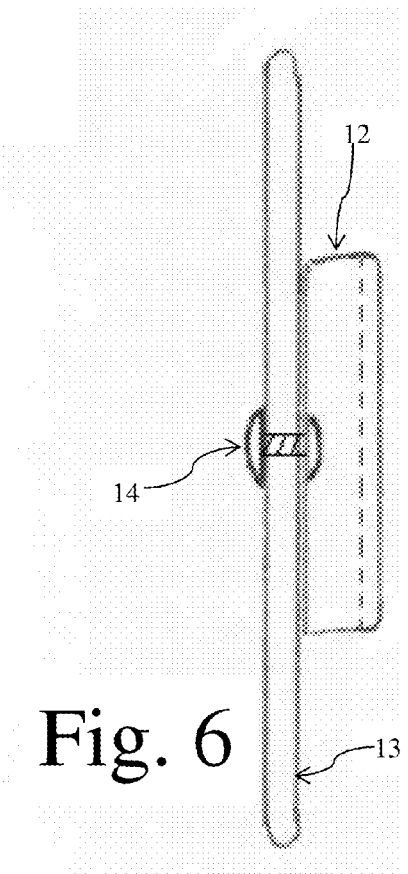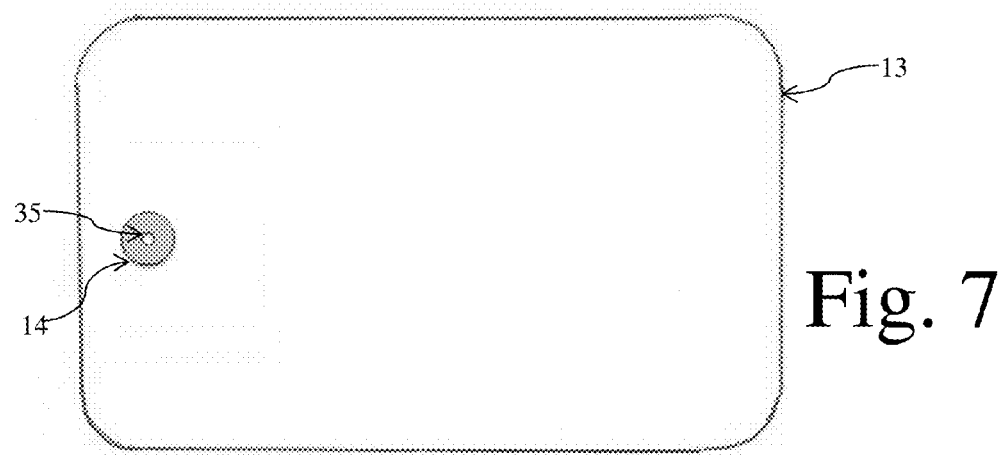

CLIP ON CAR VISOR EXTENSION

CROSS REFERENCE TO RELATED APPLICATIONS

Provisional Patent Application No. 61/603,280
EFS ID 12159973
Filing Date Feb. 25, 2012
Confirmation No. 5517

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

This device relates to an extension of an existing automobile sun visor. Sun visors made by automobile manufacturers protect the driver from sun glare when the sun is directly in front of him or her. If the sun is to the side of the driver or front seat passenger, positioning the existing sun visor on the side, adjacent to the user, does not always prevent the user from being irritated by the sun. If the sun's rays come from the side of the user into the car, the user can turn the standard visor to the adjacent side window, but since very few roads are straight as an arrow, as the vehicle turns while driving, the angle of incidence of the light also changes as his directionality changes. Thus he is susceptible to sun glare from the now unprotected side area. Sun visors are a fairly uniform size and since they are opaque they cannot be so wide that they would block the rear view mirror or extended too far downward since they would then block the vision of the driver or front seat passenger. Consequently the sun glare often affects the user's eyes below the lowest position of the visor and the uppermost rear corner area of the side window such that the visor offers no sun protection to the user unless he strains upward or forward. There are a few characteristics which a successful sun shield product must possess. It must be universally adaptable for use on all or at least most all motor vehicle models. The product must be easily accessed by the user and readily adjusted to the particular condition. The product also must be inexpensive. To date, no product intended for use in blocking out sun glare in motor vehicles has been developed which truly has all the aforementioned characteristics. The clip on car visor extension is readily positioned on the motor vehicles sun visor and adjusted to a use position as needed. It is adaptable for installation on most vehicle models and is beneficial to drivers and front seat passengers of all heights. There is no sun visor extension device known in prior art which can be attached to a standard vehicle sun visor and extended by swiveling outward, which may be utilized to provide the user (driver or front seat passenger) from sun glare coming from the uppermost rear corner area of the side door window. Many attempts have been made to create a device which attaches to the vehicle sun visor to solve what has proven to be a longstanding problem such as the following prior art:

U.S. Pat. No. 4,580,829 to Matheopoulos discloses an adjustable bi-directional vehicle visor pivotally mounted to the vehicle adjacent the windshield allowing horizontal rotation between a stored position and an operating position. The devise consists of an opaque first visor and a second transparent tinted visor which overlays the first visor when it is in the stored position and is pivotable about the first visor when in operating position to allow shielding both at the front and sides simultaneously. The second visor may also be positioned in parallel alignment below the first visor. In this construction, the visor is incapable of providing additional glare protection axially from the visor.

U.S. Pat. No. 4,728,142 and U.S. Pat. No. 4,828,314 to Gavagan discusses a visor assembly having one or more retractable glare screens integrated with the visor so as to be extended and retracted from the visor as required. The glare screens are guided for retracted movement by slot followers travelling in elongated guide slots formed in the visor center board member. In this configuration, a slot follower is required to limit travel of the blades. In addition, such configuration is intended for use with a visor having a center board member.

U.S. Pat. No. 4,792,176 to Karford discloses a visor extension unit which is adapted for releasable attachment to a conventional visor of a motor vehicle. The device includes a support frame having opposed surfaces and means for attaching one of the surfaces to the body of the visor. A pair of guide passages at opposite ends of the unit enable the visor panel to be manually moved in a horizontal direction extending either from the left side or right side based on the location of the sun. In this construction, no limiting means exists for preventing the visor from being pulled completely outside the visor.

U.S. Pat. No. 4,824,161 to Lee discloses an automobile visor having a vertical series of pivotally connected shield plates which are suspended from a horizontal hanging portion of a hanging rod portably mounted on a roof panel. The shield plates are in horizontal alignment when unfolded, each containing a side slot having a side plate horizontally extendable therefrom. In this construction, it is necessary to unfold at least one plate and then extend the insert horizontally to protect against glare. There are no limiting means for retaining the blade within one of the connected shield plates.

U.S. Pat. No. 4,323,275 to Lutz discloses a housing having an auxiliary visor connected at two locations to the existing visor originally mounted on the motor vehicle. Limiting stops having a lug sliding in an associated slot is used to prevent complete withdrawal of the auxiliary visors. In this construction, modification of the original visor is required to properly mount the housing containing the auxiliary visors. Furthermore, the mounting of the additional housing increases the thickness of the visor, thereby interfering with the positioning of the visor in the stored position.

BRIEF SUMMARY OF THE INVENTION

The object of the present device is to provide the user (driver or front seat passenger) with protection from glare coming from the uppermost rear corner area of the side window. It is also an object of the clip on car visor extension to provide such protection which is simple and convenient for the user to use and can be added on to any model of existing sun visors at any time. The clip on car visor extension is a device that can be semi permanently attached to the original vehicle visor when it is positioned adjacent to the side window. Once the device is clipped onto the existing visor at the far end of the original vehicle visor, the device can be extended/swiveled outward so that it shades the user from the glare of the sun. When not in use the visor sheet element can easily be swiveled into a stored position that is completely out of the way and does not interfere with the normal use of original vehicle's sun visor. The materials used for manufacturing result in a lightweight, multi-positional device which attaches to most existing vehicle sun visors. Proper use of the existing vehicle sun visor and the clip on car visor extension device can significantly prevent problems associated with sun glare such as eye fatigue, eye discomfort and vision impairment. Bright light glare from another vehicle can also be alleviated by use of the clip on car visor extension. Normal operation of the vehicle's visor is not affected.

BRIEF DESCRIPTION OF THE SEVERAL VIEWS OF THE DRAWING

FIG. 5 is a right elevation view of the device illustrated in FIG. 2.

FIG. 6 is a left elevation view of the device illustrated in FIG. 2.

FIG. 7 is a rear elevation view of the device illustrated in FIG. 2.

DETAILED DESCRIPTION OF THE INVENTION

The device is intended for use on motor vehicles of all types, including, vans, pickup trucks and transport trucks. The device is mounted at least on the motor vehicle's driver side or front passenger side sun visor.

Figure 1:
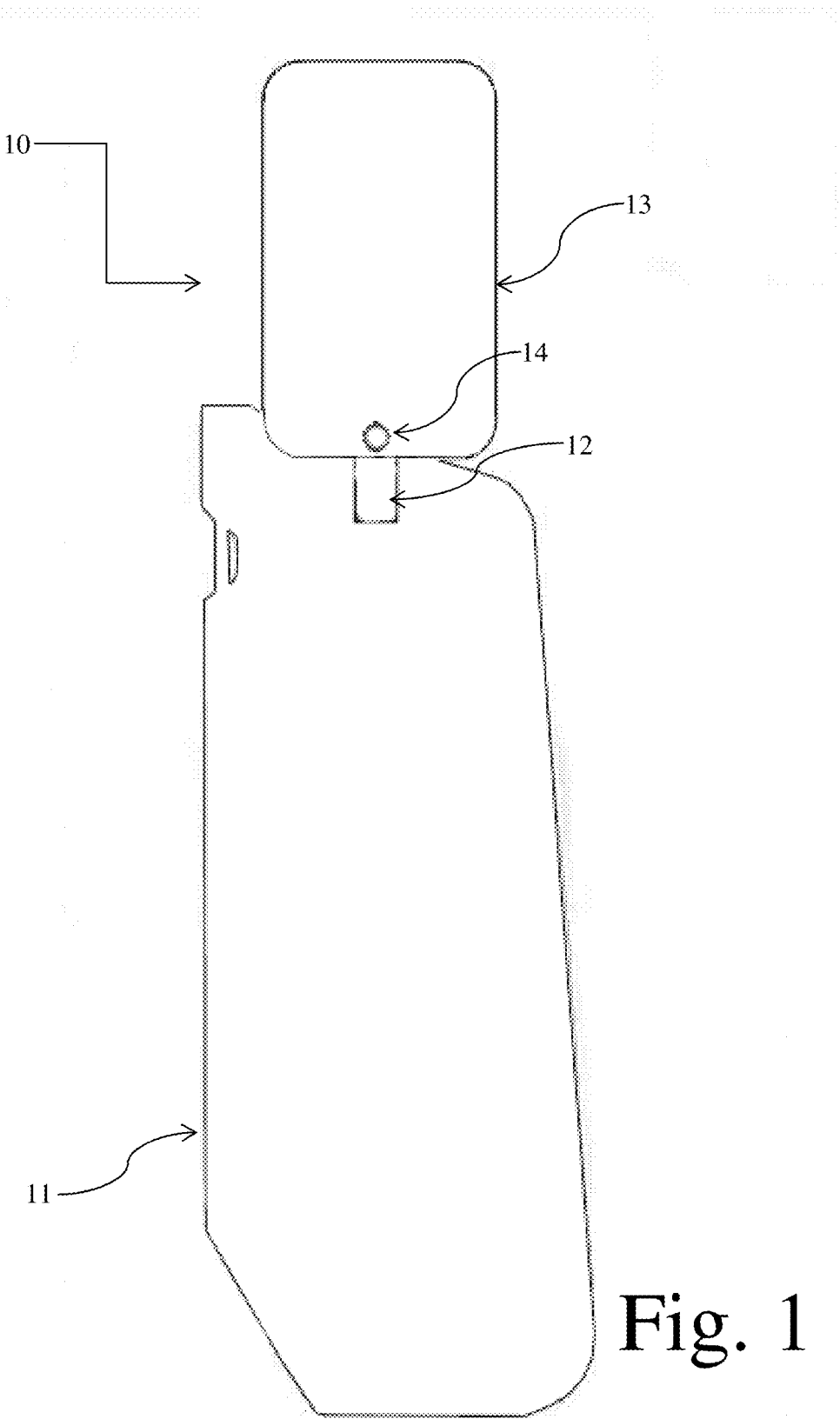
FIG. 1 is an environmental view of the device mounted on the sun visor of a motor vehicle.
Figure 2:
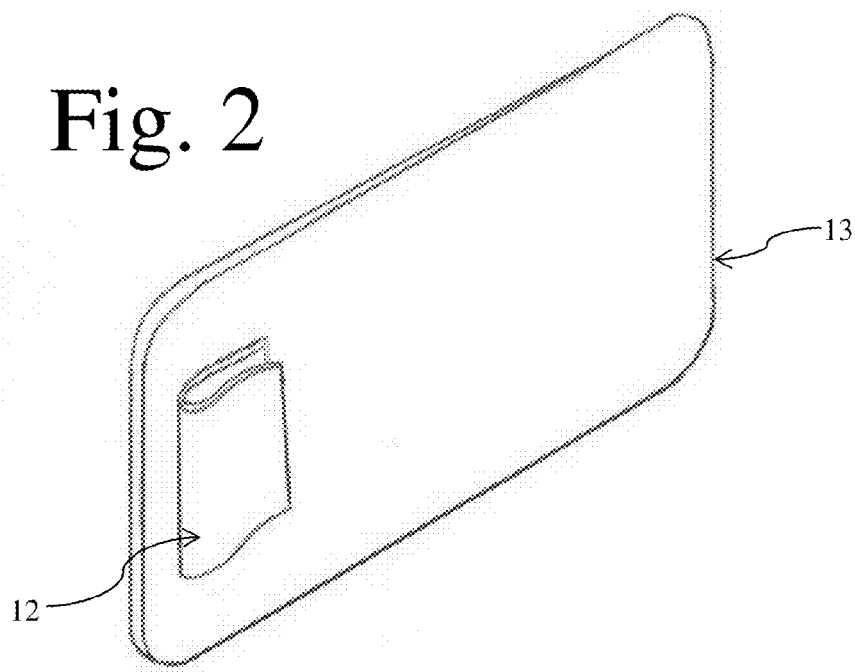
FIG. 2 is a front perspective view of the device

With reference to FIG. 1, the device 10 is mounted on the driver's side (or front passenger's side) sun visor 11 of a motor vehicle. As best seen on FIG. 1, the clip on car visor extension 10 comprises a clip member 12 and a glare reducing sheet element 13 and a rivet like fastener 14. Each of the components of the device is described in detail in the following paragraphs and with particular references to the drawings. A manner of use of the device is also described.

Figure 3:
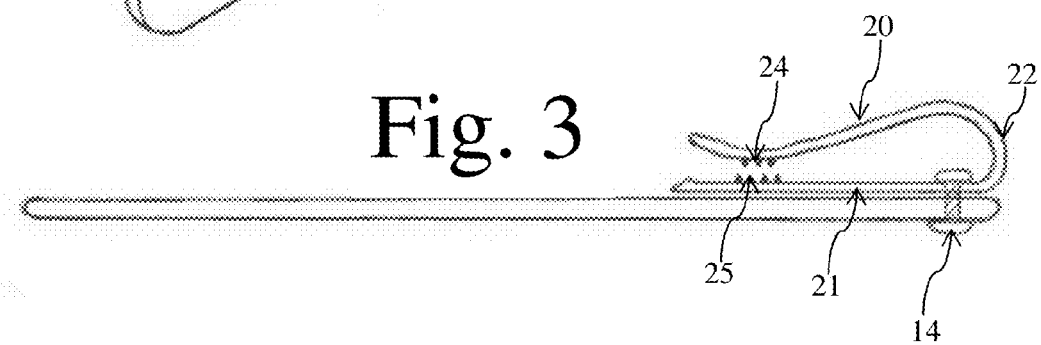
FIG. 3 is a top plan view of the device illustrated in FIG. 2.
Figure 4:
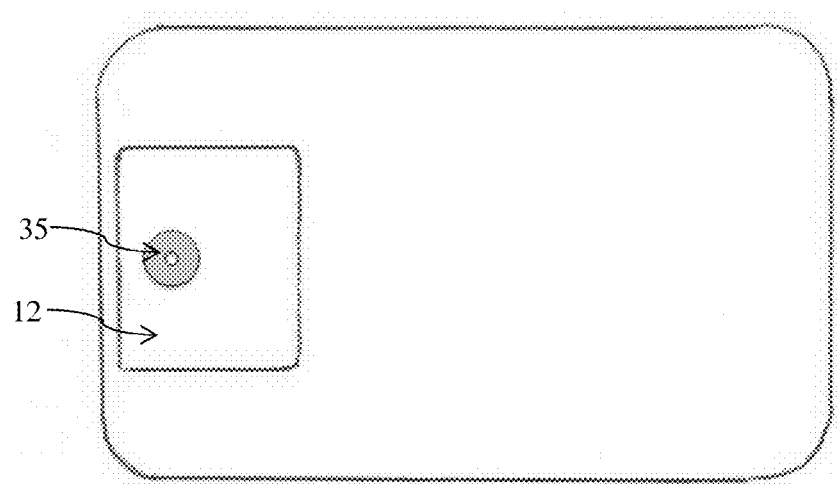
FIG. 4 is a front elevation view of the device illustrated in FIG. 2.

The clip member 12 of the device 10 is best seen in FIGS. 3 thru 5. The clip member 12 is for semi permanently mounting to the motor vehicles sun visor and for holding the glare reducing sheet element 13 in a manner which permits position adjustability to block out glaring light. Two elongated legs 20 and 21 are joined at their closed ends by a connecting leg 22. The resultant clip member has a generally U-shape configuration when viewed from the side as seen in FIG. 3.

As should be apparent, the clip member's configuration permits a free end of the clip member to be forced onto the motor vehicle's sun visor, normally until the top of the connecting leg contacts a lateral edge of the visor. Each elongated leg 20 and 21, as measured from a point where a lower end meets the top of the connecting leg to an extremity of an upper end ranges from about two inches to about four inches.

The upper end of at least one elongated leg has rows of ridges which act as a grabber and aid in holding the clip member to the sun visor. As evident in FIGS. 3 and 4, the grabber means a set of substantially horizontally extending ridges 24 and 25 on an inside face of the open end of each leg. The ridges 24 and 25 extend substantially across the elongated legs 20 and 21, respectively, and are opposed to one another. One set of ridges grabs a front surface of the sun visor and the opposed second set of ridges grabs the back surface of the sun visor.

Again with reference to FIG. 3, the elongated legs of the clip member 12 are capable of being flexed outwardly to 0.75 inch initially to position the clip member onto the sun visor and then, upon release of a spreading force, resume their natural position. There is sufficient resiliency in the clip member to accommodate different thicknesses of automobile sun visors and to accommodate a mirror or other object often built into an automobile's sun visor by the vehicle's manufacturer. A friction fit onto the vehicle's sun visor as aided by the horizontally extending ridges acts to semipermanently hold the clip member in place. The holding power of the clip member is adequate to withstand normal bumps and vibrations encountered on the road.

The connecting leg 22 holds the elongated legs 20 and 21 at a spaced relationship approximately equal to or slightly less than the thickness of the vehicle's sun visor, i.e. from about 0.25 inches to about 0.50 inches.

The clip member 12 is preferably made of a composite material in an injection molding operation for cost reasons. It can also be made of other materials such as a metal and made by other production techniques such as machining or extrusion molding.

With reference to FIGS. 1, 4 and 7, the glare reducing composite sheet element 13 is flat with a generally rectangular shape and further has a thin cross section. The sheet element can have other geometric shapes which are conducive to creating a substantial sun glare blocking function. Preferably, the glare reducing composite sheet element 13 ranges from about four inches to about eight inches in width and about three inches to about five inches in height. It has a thickness of less than about 0.50 inches, preferably from about 10 mil to about 30 mil.

As best seen in FIGS. 4 and 7, the glare reducing composite sheet element 13 has a hole centrally located 35 adjacent to a lateral edge area for attachment purposes to the clip member 12. As apparent in FIG. 3, when the glare reducing composite sheet element 13 is properly fastened by a rivet 14 or similar fastener to the clip member 12, the composite sheet frictionally adjoins onto the clip member to allow a rotational movement of the sheet element 13 about the axis 15 of the rivet 14 that is now joined to the clip member.

Figure 8:
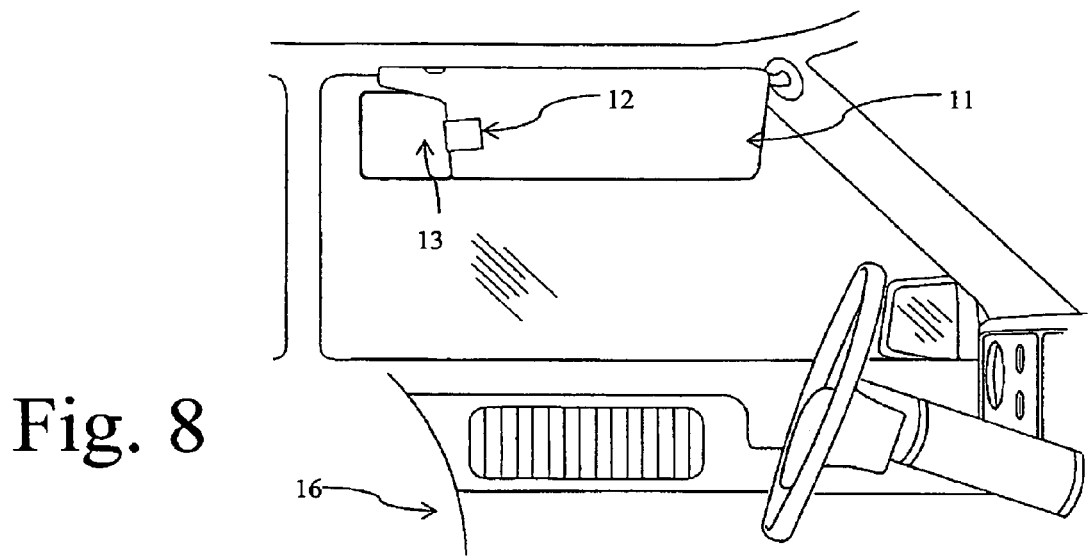
FIG. 8 is an environmental view of the device mounted on the sun visor of a motor vehicle

The sheet element 13 is fastened to the clip member 12 and when not in use, it can simply be rotated about the connecting fastener 14 of the clip member until it is flat against the vehicle's sun visor. As best seen in FIG. 8, when needed to block out sun glare, the sheet element 13 is rotated about the fastener 14 until a sheet element angle is reached which blocks out the sun glare, yet permits maximum road view. The opposed surfaces of the clip member and the sheet element frictionally engage walls of the two surfaces such that the sheet element angle is retained once reached with minimal torque.

The glare reducing composite sheet element 13 is preferably translucent to allow the vehicle's driver or front seat 16 passenger to see through the sheet element for safe driving purposes, though it could be opaque as well. The composite sheet element 13 can be made by injection molding a polycarbonate resin to obtain the sheet element or by die cutting the sheet element from sheet goods. The resin used to make the sheet element of the sheet is preferably made glare reducing by tinting with a colorant having any desired color shade such that sun glare is significantly reduced, but objects are still visible through the sheet element.

In use, the clip member is forced onto the automobile sun visor of the vehicle. The user can now slide the clip member laterally left or right or horizontally up and down until the glare reducing composite sheet element is in position to block out unwanted sun rays. A final adjustment is made by rotating the glare reducing composite sheet element rotationally about the connecting fastener 14 axis 15 until the sun rays are fully blocked out and maximum road viewing is retained. Because only one clip member is needed with the sun shield, the user can adjust the clip member's position and the glare reducing composite sheet's position with one hand.

Figure 9:
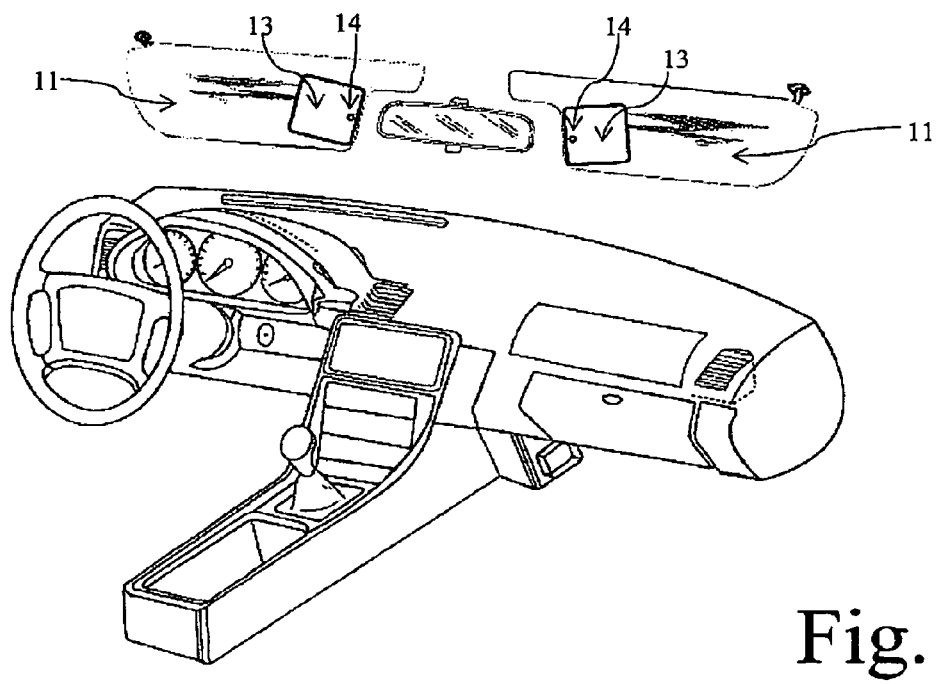
FIG. 9 is an environmental view of the device mounted on the sun visor of a motor vehicle

The automobile sun visor can be approximately positioned and the clip on car visor extension precisely positioned to accomplish its function. As best seen in FIG. 9, when no longer needed because of a change of travel direction or sun position, the glare reducing composite sheet element 13 is rotated until it is flat with the vehicle's sun visor 11.

Having described the device in its preferred embodiment, it should be clear that modifications can be made without departing from the spirit of the device. It is not intended that the words used to describe the device nor the drawings illustrating the same be limiting on the device. It is intended that the device only be limited by the scope of the appended claims.

We claim:

1. A sun visor extension for attachment to a sun visor of a vehicle for inhibiting entry of undesired light into the vehicle, the sun visor having a perimeter edge, the sun visor extension comprising:
   a single sheet of material, the single sheet of material having the property of being one of translucent and opaque, the single sheet of material having a fastener attachment point near a perimeter, the sheet of material configured to be smaller in area than the sun visor;
   a clip with a first opposing jaw biased towards a second opposing jaw, the first opposing jaw and the second opposing jaw configured to grip the sun visor therebetween; and
   a rotating fastener connecting the clip near the perimeter of the single sheet of material, such that the rotating fastener provides frictional resistance to the rotation of the single sheet of material relative to the clip;
   wherein the clip is configured to grasp the perimeter edge of the sun visor, and the single sheet of material is configured to manually rotate about the rotating fastener between a retracted state and a deployed state;
   and wherein, when in the retracted state, the sheet of material is configured to lie flat against the sun visor and within the perimeter edge so that the sun visor can be raised without interference in operation of the sun visor;
   and wherein, in the deployed state, the sheet of material is configured to extend beyond the perimeter edge of the sun visor, when the visor is in the lowered position.

2. The sun visor extension of claim 1 wherein the single sheet of material is substantially rectangular.

3. The sun visor extension of claim 1 wherein the single sheet of material is translucent, and the single sheet of material is tinted for reducing entry of undesired light into the vehicle.

4. The sun visor extension of claim 1 wherein the single sheet of material has a thickness of less than 30 mil.

\* \* \* \* \*